US00RE37225E

(19) United States
(12) Reissued Patent
Swartzel et al.

(10) Patent Number: US RE37,225 E
(45) Date of Reissued Patent: Jun. 12, 2001

(54) METHOD FOR THE ULTRAPASTEURIZATION OF LIQUID WHOLE EGG PRODUCTS

(75) Inventors: Kenneth R. Swartzel, Raleigh; Hershell R. Ball, Jr., New Hill, both of NC (US); Mohammad-Hossein Hamid-Samimi, Eden Prairie, MN (US)

(73) Assignee: North Carolina State University, Raleigh, NC (US)

(21) Appl. No.: 08/061,985

(22) Filed: May 14, 1993

Related U.S. Patent Documents

Reissue of:
(64) Patent No.: 5,019,408
Issued: May 28, 1991
Appl. No.: 07/628,716
Filed: Dec. 17, 1990

U.S. Applications:
(

(63) Continuation of application No. 07/880,899, filed on May 8, 1992, now abandoned, which is a continuation of application No. 07/535,718, filed on Jun. 11, 1990, now Pat. No. 4,994,291, which is a continuation of application No. 07/311,594, filed on Feb. 16, 1989, now Pat. No. 4,957,759, which is a continuation of application No. 06/904,744, filed on Sep. 8, 1986, now Pat. No. 4,808,425.

(51) Int. Cl.[7] ..... A23L 1/32; A23L 3/16; A23B 5/005

(52) U.S. Cl. ..... 426/399; 426/521; 426/614

(58) Field of Search ..... 426/399, 521, 426/520, 614, 106

(56) References Cited

U.S. PATENT DOCUMENTS

| | | | | |
|---|---|---|---|---|
| 2,565,311 | * | 8/1951 | Koonz et al. | 426/521 |
| 3,113,872 | | 12/1963 | Jones et al. . | |
| 3,404,008 | * | 10/1968 | Ballas et al. | 426/521 |
| 3,409,446 | * | 11/1968 | Van Olphen . | |
| 3,579,631 | * | 5/1971 | Stewart et al. | 424/86 |
| 3,717,474 | | 2/1973 | Fioriti . | |
| 4,333,959 | | 6/1982 | Bracco . | |
| 4,524,083 | * | 6/1985 | Liot . | |
| 4,675,202 | * | 6/1987 | Wenger et al. | 426/614 |

FOREIGN PATENT DOCUMENTS

| | | |
|---|---|---|
| 1271154 | 7/1961 | (FR) . |
| 364129 | 6/1930 | (GB) . |
| 390131 | 6/1930 | (GB) . |
| 1543512 | 4/1979 | (GB) . |

OTHER PUBLICATIONS

Bonduelle, M., "A New Technique in the Preservation of Egg Products," 1978, pp. 1–10.
Essary, "New Uses of Heated Aseptically Packaged Fluid Egg Products."
Stone et al., "Aseptic Processing of Liquid Eggs Pasteurized In A Teflon Heat Exchanger," (1983) and Letter from W. K. Stone dated Apr. 20, 1983.
PSA Abstract.
Declaration of Essary.
Declaration of Stone.
Egg Pasteurization Manual ARS74–48, Mar. 1969, U.S. Department of Agriculture, Agriculture Research Service.*
7 CFR Part 59 (1985).*
*Poultry Sci.* 61, 1461–1462 (1982) (Abstract).*
E. O. Essary, P. R. Rony and W. F. Collins, New Uses of Heated Aseptically Packaged Fluid Egg Products.*
Laura C. Jacobs, Aseptic Packaging Promises New Role for Pasteurized Liquid Eggs.*
M. H. Hamid–Samimi and K. R. Swartzel, *J. of Food Proc. and Pres.* 8, 219 (1984).*
Kenneth R. Swartzel, *J. of Agri. and Food Chem.,* 34 396 (May/Jun. 1986).*
Abstract concerning Poultry Science Association Annual Meeting, Jul. 29–Aug. 2, 1985, Iowa State University, Ames.*
Mohammad–Hossein Hamid–Samini, Thesis: Criteria Development for Extended Shelf–Life Pasteurized Liquid Whole Egg (1984).*

* cited by examiner

*Primary Examiner*—Anthony J. Weier
(74) *Attorney, Agent, or Firm*—Myers Bigel Sibley & Sajovec, P.A.

(57) ABSTRACT

Methods of ultrapasteurizing liquid whole egg products in continuous flow, high temperature, short time pasteurization equipment are provided. The equivalent point method is preferably used to evaluate the total thermal treatment received by the product in this equipment. Also disclosed is a method of making liquid whole egg products having preselected, extended, refrigerated shelf lives.

The questions raised in reexamination request No. 90/003, 682, filed Jan. 5, 1995, have been considered and the results thereof are reflected in this reissue patent which constitutes the reexamination certificate required by 35 U.S.C. 307 as provided in 37 CFR 1.570(e).

26 Claims, 4 Drawing Sheets

METHOD FOR THE ULTRAPASTEURIZATION OF LIQUID WHOLE EGG PRODUCTS

Matter enclosed in heavy brackets [ ] appears in the original patent but forms no part of this reissue specification; matter printed in italics indicates the additions made by reissue.

*This application is a continuation of prior reissue application Ser. No. 07/880,899, filed May 8, 1992, now abandoned the disclosure of which is incorporated by reference herein in its entirety.* [This] application *Ser. No. 07/880,899 is a reissue application of U.S. application Ser. No. 07/628, 716 filed Dec. 17, 1990 and now U.S. Pat. No. 5,019,408 which* is a continuation of pending prior U.S. application Ser. No. 07/535,718, filed Jun. 11, 1990 now U.S. Pat. No. 4,994,291, which is a continuation of prior U.S. application Ser. No. 07/311,594, filed Feb. 16, 1989, now U.S. Pat. No. 4,957,759, which is a continuation of prior U.S. application Ser. No. 06/904,744, filed Sept. 8, 1986, now U.S. Pat. No. 4,808,425, issued Feb. 28, 1989.

DESCRIPTION OF THE INVENTION

The present invention relates to the pasteurization of liquid whole egg products generally, and particularly relates to ultrapasteurization methods which can be used to produce liquid whole egg products which have good functional properties and which have extended refrigerated shelf lives.

BACKGROUND OF THE INVENTION

The U.S. egg industry produced more than 300 million pounds of frozen pasteurized egg products in 1985. The relatively mild pasteurization processes used are designed to eliminate Salmonella from eggs for all practical purposes, but do not destroy organisms capable of spoiling egg products held under refrigerated temperatures above freezing. The survival of spoilage organisms in pasteurized egg, coupled with conventional packaging technology, results in products with limited shelf life (7–14 days at 40° F.) that require freezing and frozen distribution systems for preservation. Freezing is cost intensive, lowers the functional quality (flavor, performance, etc.) of the egg product, and results in an inconvenient product that requires thawing prior to use.

Standard pasteurization practices for liquid whole egg products are generally discussed in the Egg Pasteurization Manual (USDA Agricultural Research Service 1969). See also U.S. Pat. No. 3,949,099 to Kaufman, at column 1, lines 46–58 (summarizing pasteurization processes). The Egg Pasteurization Manual notes that experiments conducted in England to establish treatment conditions used there, which were carried out in a high temperature, short time pasteurization unit, included trials with holding times of two and one-half minutes and temperatures up to 151 degrees Fahrenheit (66.1 degrees Centigrade). The functional quality of these eggs is not discussed; however, it is noted that England adopted a lower temperature of 148 degrees Fahrenheit as a treatment condition. The Manual observes that such "severe" treatments help increase the stability of egg products in liquid form, but does not teach how this can be accomplished without sacrificing desirable functional properties of the products. For other types of egg products which are more heat stable, pasteurization temperatures as high as 152 degrees Fahrenheit (66.67 degrees Centigrade) have been reported. Again, little is known about how to ultrapasteurize (decrease the number of spoilage microorganisms to levels lower than obtained with a pasteurization procedure) these products by heating without sacrificing functional performance.

Higher temperatures than those investigated in England have been explored. See e.g., Essary, E. O., Rony, P. R., and Collins, W. F., New uses of heated aseptically packaged fluid egg products. Report to the American Egg Board (1983). This work suggested that merging techniques of ultrapasteurization with aseptic packaging can be accomplished to yield safe, stable, and functional liquid whole egg. This research suggested and used a heat exchanger operated in laminar flow to process whole egg at elevated temperatures, and used an ethylene oxide-flushed glove box to aseptically package the product (neither device approved for the commercial production of a salable product). Holding temperatures of up to 154 degrees Fahrenheit (67.8 degrees Centigrade) were reported. The results of this pioneering work demonstrated the possibility of extending the refrigerated shelf life of liquid whole egg products, but did not enable the commercial production of a refrigerated product which could be sold to consumers.

To carry out ultrapasteurization of liquid whole egg products on commercial equipment, the time and temperature parameters of the thermal treatment must be selected with care. Arbitrary increases in thermal treatment will likely produce a functionally unacceptable product, or—even worse—coagulation of the product and blockage of the pasteurizing equipment. Because such pasteurizing equipment operates at high pressures (e.g., 1,500 p.s.i. and more) the consequences of blockage are serious. For these reasons, it is essential to know how liquid whole egg products respond to various thermal treatments before experimenting with the production of these products on commercial equipment.

Because this essential information was not available, Hamid-Samimi investigated the time and temperature parameters which should be used in commercial equipment to obtain a functionally acceptable, ultrapasteurized, liquid whole egg product M. H. Hamid-Samimi, Criteria Development for Extended Shelf-Life Pasteurized Liquid Whole Egg. Ph.D. Thesis, North Carolina State University (1984). This research was carried out at the laboratory bench, with a Brookfield viscometer, which processed the product in small batches rather than continuously. Processing times and temperatures defining thermal treatments producing a soluble protein loss (SPL) of up to 5% from the product, as an upper limit, were suggested as producing a functionally acceptable product. The suggested 5% SPL limit was defined by a graph line in the thesis: this line is reproduced herein in FIG. 3 as the 5% SPL (Batch) line. Time and temperature values tested by other investigators which were believed to be the limits of pasteurization are summarized in M. H. Hamid-Samimi and K. R. Swartzel, J. Food Processing and Preservation 8: 219, 221 FIG. 1 (1984). All are below the 5% SPL (Batch) line.

The present inventors sought to test the predictions of Hamid-Samimi by ultrapasteurizing liquid whole egg on continuous flow, high temperature, short time pasteurization equipment. It was unexpectedly found that functionally acceptable liquid whole egg can be produced at times and temperatures greater than previously believed. These findings, which will be explained in detail below, enable the commercial production of functionally acceptable products with longer refrigerated shelf lives than heretofore available. As will also be explained below, discovery of these unexpected results has led to the identification of several steps which should be taken to produce ultrapasteurized liquid whole egg products that have superior functional properties.

The object of the present invention, in short, is to provide liquid whole egg products for refrigerated distribution which have greatly reduced levels of spoilage microorganisms, while still having good functional properties.

SUMMARY OF THE INVENTION

This object is achieved by a method of ultrapasteurizing liquid whole egg products. The method comprises passing the liquid whole egg product as a continuous stream through a pasteurizing apparatus, during which the liquid whole egg product is heated to a predetermined real temperature. The method is practiced so that the total thermal treatment received by the liquid whole egg product is described by an equivalent temperature and an equivalent time (these terms are explained in detail below) defining a point above the 5% SPL (Batch) line of FIG. 3, but insufficient to cause coagulation of the product.

Also disclosed herein is a method of making a package liquid whole egg product characterized by a preselected refrigerated shelf life of from about four weeks to about 36 weeks. This method comprises passing the liquid whole egg product as a continuous stream through a pasteurizing apparatus, during which the liquid whole egg product is heated for a predetermined time and to a predetermined temperature. The predetermined time and the predetermined temperature are chosen to impart the preselected shelf life to the liquid whole egg product. After it is heated, the liquid whole egg product is aseptically packaged.

Preferably, the continuous stream of liquid whole egg product referred to in each of the methods above is at least periodically subjected to turbulence while it is heated. The liquid whole egg products are also, preferably, homogenized after they have been heated. In addition, the methods described above are more narrowly described as methods in which the liquid whole egg product is heated to a predetermined holding temperature, then maintained at said predetermined holding temperature for a predetermined holding time, and then cooled.

BRIEF DESCRIPTION OF THE DRAWINGS

FIG. 5 is a combination graph in which FIGS. 3 and 4 are superimposed, with the S. faecalis line removed

DETAILED DESCRIPTION OF THE INVENTION

Thermal treatments simultaneously produce beneficial and undesirable changes in food products. Knowledge of kinetic methods, and how they can be applied to the mechanics of designing a thermal process, aids in attaining food quality retention and process efficiency. Determining the time and temperature requirement for a thermal process depends upon destruction of spoilage and disease causing microbial spores while minimizing undesirable physical, chemical and biological transformations that occur within the product.

Figure 1:
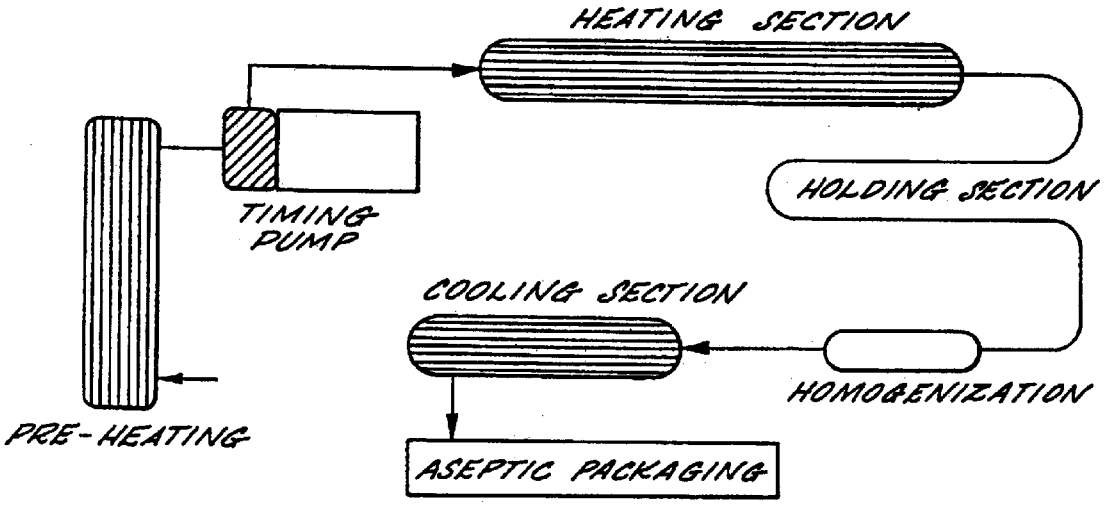
FIG. 1 is a schematic diagram of a continuous flow pasteurizing apparatus suitable for carrying out the present invention.

As schematically shown in FIG. 1, with arrowheads indicating direction of flow, continuous flow thermal processing equipment comprises heating, holding, and cooling sections. The thermal treatment received by the product in the heating and cooling stage, (illustrated in FIG. 2), is oftentimes not considered instead, only the holding time ($t_H$) and holding temperature ($T_H$) are considered. However, when products are pasteurized in such equipment at higher temperatures and shorter times, as is taught herein, the contribution of the heating stage, and perhaps the cooling stage, to the total thermal treatment of the product becomes significant, and must be accounted for if a product with good functional qualities is to be obtained and coagulation during pasteurization is to be avoided. It is accordingly recommended that the equivalent point method for evaluating thermal treatments be applied in practicing the present invention. As explained in detail below, this method describes the total thermal treatment received by a product in continuous flow equipment with one equivalent time ($t_E$) and one equivalent temperature ($T_E$) (see FIG. 2).

Procedures for use of the equivalent point method for analyzing the thermal effects on products during continuous flow heating have been previously outlined (Swartzel, 1982, J. Food Sci. 47:1886 and Swartzel, 1986, J. Agric. Food Chem 34:397) and are known to those skilled in the art This method differs substantially from previous methods in that all other methods define the thermal treatment based upon a single factor such as enzyme inactivation, microbial destruction, protein denaturation, nutrient loss, etc. The problem with these other methods in that a physical and/or chemical effect (flavor, color, product separation and gelation during storage if thermally related) may actually be the shelf life limiting factor.

Figure 2:
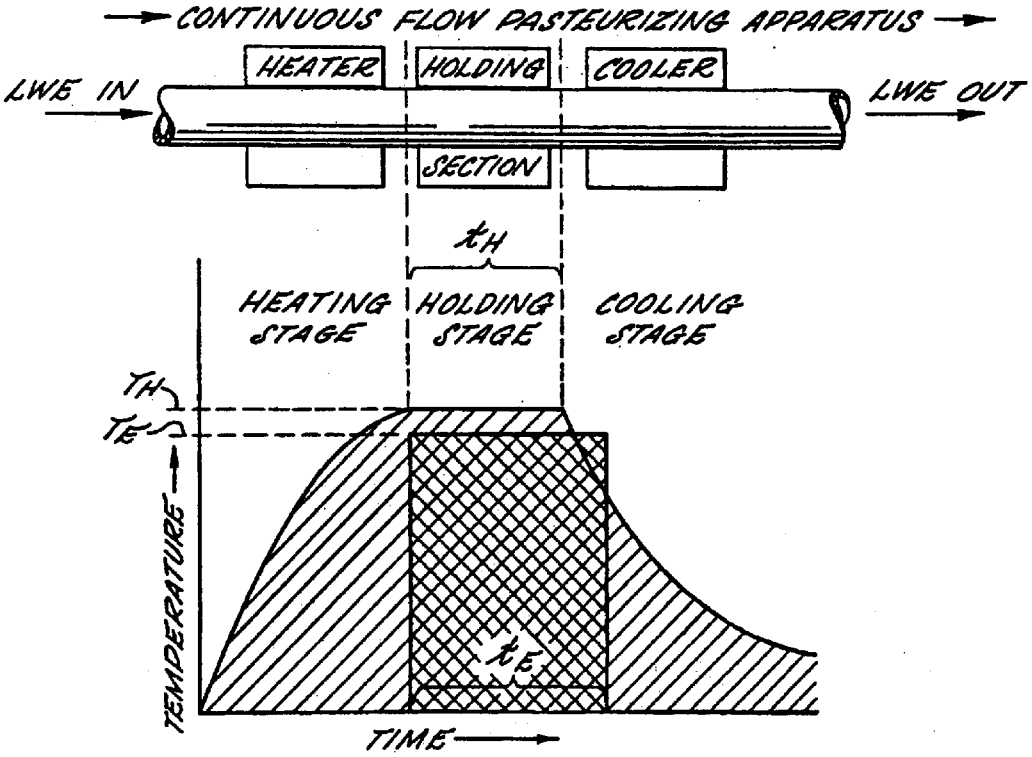
FIG. 2 is a diagram illustrating the differences and relations between real holding times and holding temperatures, and equivalent times and equivalent temperatures for describing total thermal treatments, in continuous flow pasteurizing equipment.

The unique feature of the equivalent point method lies in the fact that, they for any thermal curve, one equivalent time and equivalent temperature combination exists (see FIG. 2). This equivalent time and temperature combination will yield the exact thermal effect on all constituents within the product as would the original thermal curve. This unique time and temperature combination is not dependent on individual constituent kinetics, as are all previous thermal evaluation procedures (it is independent of constituent activation energy).

To determine the equivalent point of a thermal system, a complete thermal history of the treatment must be available. This is obtained by measuring mixed mean product temperatures at various locations (entrance to the heat exchanger, exit of the heat exchanger and at least two locations inside the heat exchanger). Time is calculated by correlating means residence time with location of the temperature probe. With heat exchangers into which it is difficult or impractical to insert thermal probes, time-temperature curves are calculated based on knowledge of the product's physical characteristics and on the geometry of the processing equipment.

With available time-temperature curves and a basic knowledge of kinetic relationships, equivalent points can routinely be calculated. The log of a product constituent concentration ratio (initial concentration divided by concentration after treatment) is set equivalent to the integration of that constituent's Arrhenius equation (or any other appropriate function describing the temperature dependency of the rate of the reaction associated with the constituent change)

for the particular time-temperature interval (thermal history previously defined) For a given activation energy each section of a thermal treatment (heating, holding, and cooling) will produce a unique thermal constituent concentration ratio For the difference sections the effect may be summed For the original activation energy selected, a linear infinite log (time)-temperature relationship exists. Any and all of these infinite time and temperature combinations would produce the same thermal effect on a constituent (with the same activation energy) as during the original thermal treatment. By reexamining the original thermal curves with different activation energies a series of infinite linear log (time)-temperature relationships are developed (one line in a log (time)-temperature plot per activation energy). Uniquely all lines intersect at one point. This unique time-temperature is the equivalent point for the original thermal curve. It accounts for all thermal treatment and is used to accurately predict constituent change, or product characteristic.

Figure 3:
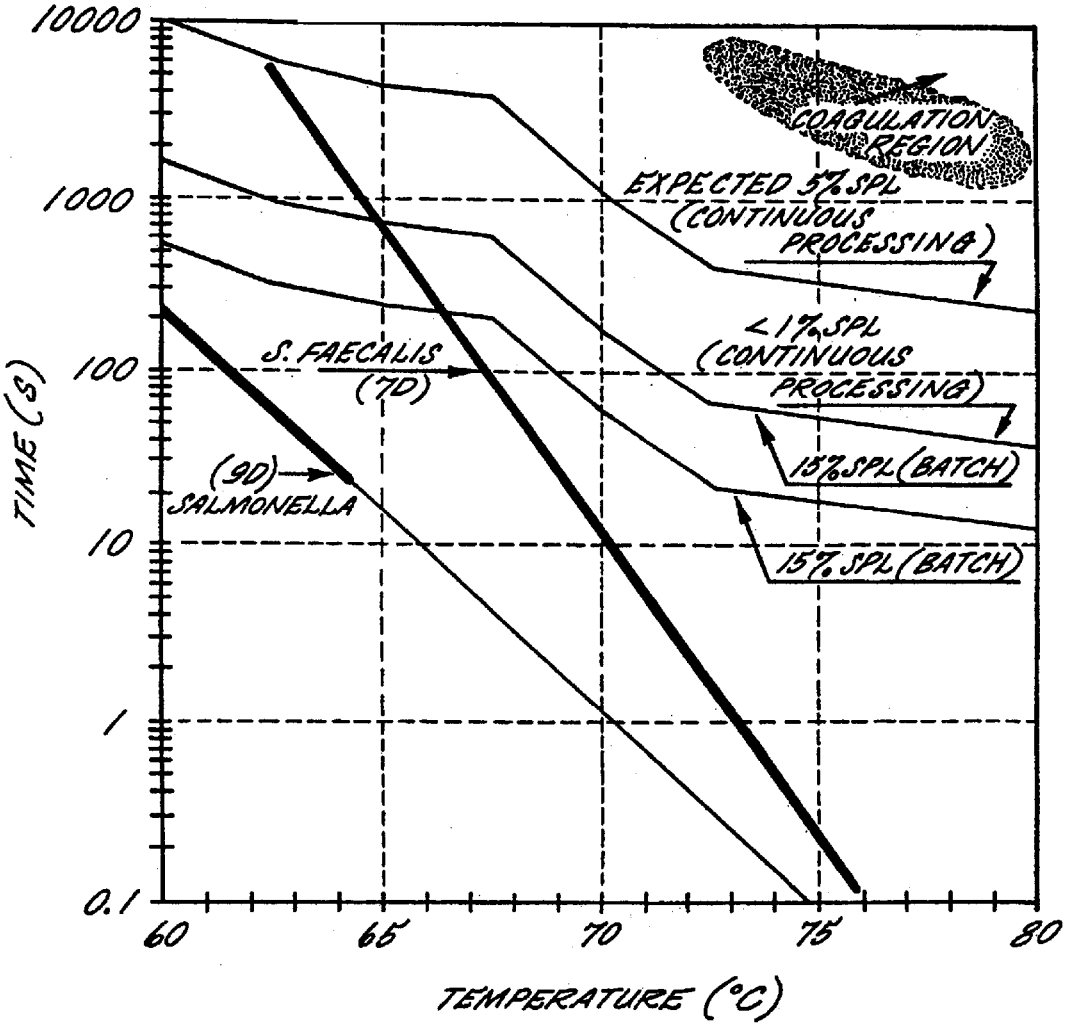
FIG. 3 is a graph showing time and temperature regions for the ultrapasteurization of liquid whole egg products.

FIG. 3 sets forth thermal treatments which should be used to ultrapasteurize liquid whole egg products. Thermal treatments defined by points above the 5% SPL (Batch) line have not heretofore been suggested. For practicing the present invention in continuous flow processing equipment, the thermal treatment is described by a point on FIG. 3 defining an equivalent time and an equivalent temperature, as explained above. The thermal treatment should be more than sufficient to pasteurize the liquid whole egg product "Pasteurize" means to cause a nine log cycle (9D) or 99.9999999% reduction in Salmonella in the product being treated. The thermal treatment should be insufficient to cause the liquid whole egg product to coagulate. The thermal treatment should more particularly cause not more than a 15% soluble protein loss (SPL) in the liquid whole egg product being treated, and will preferably cause not more than 5% soluble protein loss in the product being treated. The expected 5% SPL (continuous processing) line on FIG. 3 indicated approximately the upper limit on thermal treatments which can be tolerated without sustaining more than a 5% soluble protein loss (the exact location of this line for any one process will depend on the physical factors discussed below). More preferably, the thermal treatment will be designed to produce not more than about a 1% soluble protein loss from the product. As shown in FIG. 3, equivalent times and equivalent temperatures defining points along the line previously believed to represent the line at which a 15% soluble protein loss would be obtained (the 15% SPL (Batch) line), are now known to represent thermal treatments which produce ultrapasteurized products having less than a 1% soluble protein loss under continuous flow.

The line defining thermal treatments causing a seven log cycle reduction in the spoilage bacteria Streptococcus faecalis is labeled in FIG. 3 as the S. faecalis (7D) line. The S. faecalis line has a steeper slope than the several SPL lines. This illustrates that thermal treatments employing higher temperatures and shorter times are preferred for practicing the present invention. Thus, holding soluble protein loss constant (so that treatment time must be decreased as treatment temperature is increased), thermal treatments in which the product is subjected to treatment temperatures of about 67.0 degrees Centigrade or more are preferred to thermal treatments in which the product is subjected to treatment temperatures of 65° C.; treatment temperatures of about 69.0° C. or more are preferred to treatment temperatures of 67° C.; treatment temperatures of about 71.0° C. or more are preferred to treatment temperatures of 69° C.; treatment temperatures of about 73.0° C. or more are preferred to 71° C.; and so on. The foregoing statement is true whether the real temperatures (or holding temperatures) of the processes are being compared, or equivalent temperatures are being compared (thus the term "treatment temperature" is used to encompass both).

Treatment temperatures are primarily limited by the ability to accurately time the duration of the thermal treatment: as temperature is increased the treatment time must be decreased, and shorter treatment times are more difficult to administer with precision. Generally, equivalent temperatures not more than about 90° C. are preferred, and equivalent temperatures not more than about 80° C. are more preferred.

Desirable thermal treatments for practicing the present invention can also be described with reference to the S. faecalis lines. Preferably, the thermal treatment will define a point above the S. faecalis (7D) line, and more preferably the thermal treatment will define a point above the S. faecalis (9D) line. While this latter line is not plotted in FIG. 3, it can be plotted in accordance with the equations given below.

Equations for lines in the figures are as follows, where t=time in seconds, T=temperature in degrees Centigrade, and n=number of decimal reductions. Salmonella line: $\log(t)=15.96-0.227(T)$. S. faecalis lines: $\log(t)=24.62+\log(n)-0.346(T)$. % SPL lines: $\log(t)=10\ g(\%\ SPL)=9-b$, where a and b are given in Table 1 below:

TABLE 1

| T range ° C. | a (for Batch lines) | b | a (Expected) (for continuous flow lines) |
|---|---|---|---|
| 60–62.5 | 7.494 | 0.091 | 8.761 |
| 62.5–67.5 | 4.103 | 0.037 | 5.370 |
| 67.5–72.5 | 14.68 | 0.194 | 15.942 |
| 72.5 and above | 3.014 | 0.033 | 4.281 |

These equations can be used to extend the teaching of the figures beyond their depicted scope.

The liquid whole egg product is preferably heated by contacting the product to a heated surface. The heated surface is comprised of a corrosion-resistant, nontoxic and nonabsorbent material such as stainless steel. Standards for evaluating the acceptability of such product contact surfaces (the 3-A Sanitary Standards) are known and established. See, e.g. Egg Pasteurization Manual, supra, at 27.

To obtain a product with reduced amounts of spoilage microorganisms, the pasteurizing apparatus should be sterilized before the liquid whole egg product is passed therethrough. Sterilizing is preferably accomplished by passing hot water under pressure through the pasteurizing apparatus, as is known in the art, so that, among other things, hot water is contacted to the heating surface at a temperature and pressure and for a time sufficient to sterilize the heating surface.

In addition, the product, after ultrapasteurization, should be aseptically packaged. Aseptically packaged means packaged to the exclusion of microorganisms other than those carried by the liquid whole egg product. Equipment suitable for aseptically packaging liquid whole egg products is commercially available.

Figure 4:
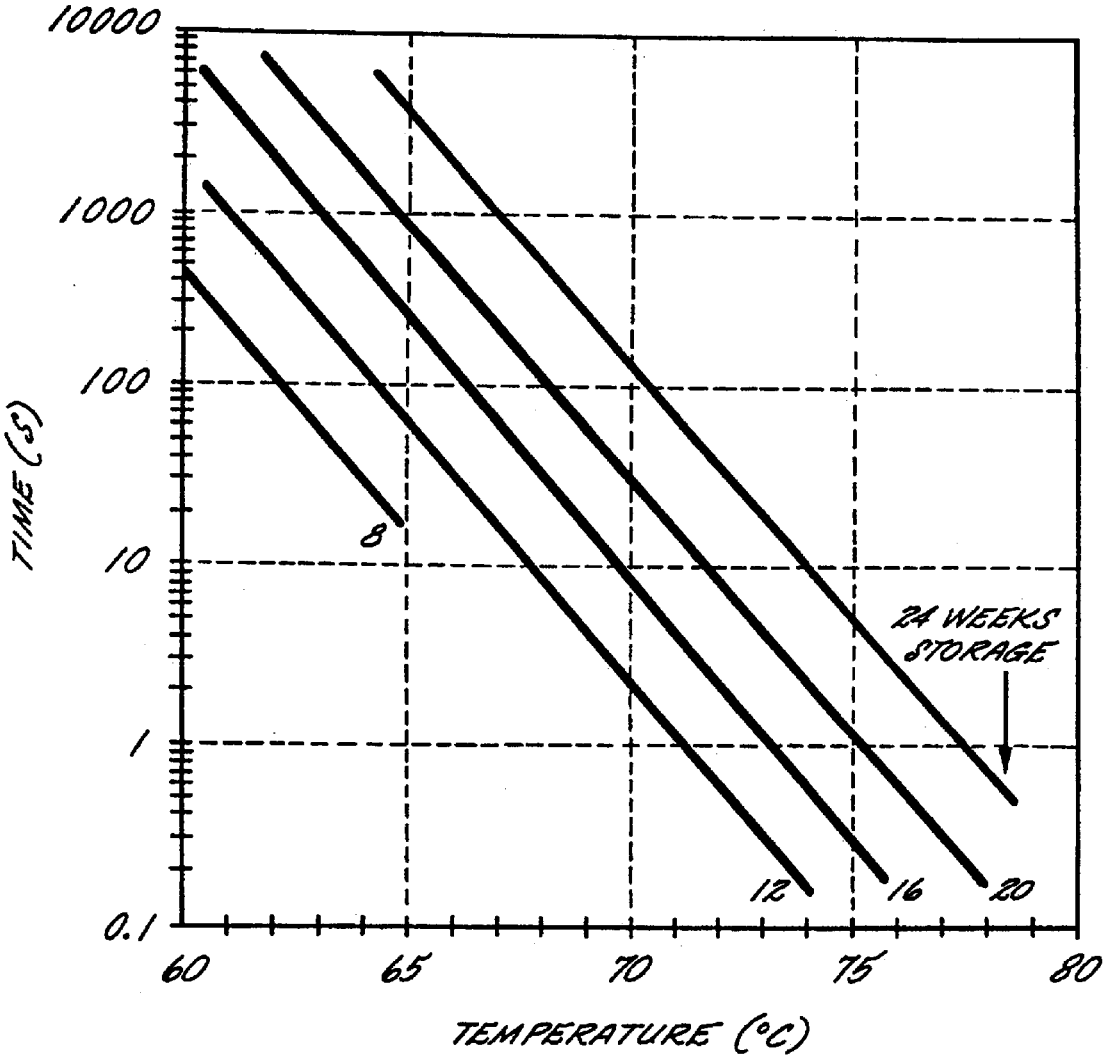
FIG. 4 is a graph showing equivalent times and equivalent temperatures that give particular refrigerated shelf lives for liquid whole egg.

FIG. 4 illustrates the refrigerated shelf life of liquid whole egg after it is ultrapasteurized and aseptically packaged, as explained above. The term "refrigerated," as used herein, means stored at a temperature of 4° C. Time and temperatures for points on each line represent equivalent times and temperatures, as also explained above. A liquid whole egg product having a preselected shelf life of from about 4–36 weeks is made by selecting a point on a line or in a region which will provide the desired shelf life, determining the equivalent time and equivalent temperature which correspond to the point selected, and—preferably through the use of the equivalent point method—establishing the operating conditions on the particular pasteurizing apparatus being used that will provide the selected thermal treatment. Products having shelf lives not depicted in FIG. 4 are made by extrapolating the teachings of the figure, in light of the teachings above. Preferably, this process is carried out in pasteurizing apparatus which has been sterilized before the liquid whole egg product is passed therethrough, as explained above, to produce products having shelf lives of about eight weeks or more. In addition, it will be appreciated that longer shelf lives are generally obtained at the expense of greater levels of soluble protein loss. Thus, if product distribution systems do not require otherwise, products with self lives of up to about 32 weeks are preferred, and products with shelf lives up to about 24 weeks are more preferred.

Figure 5:
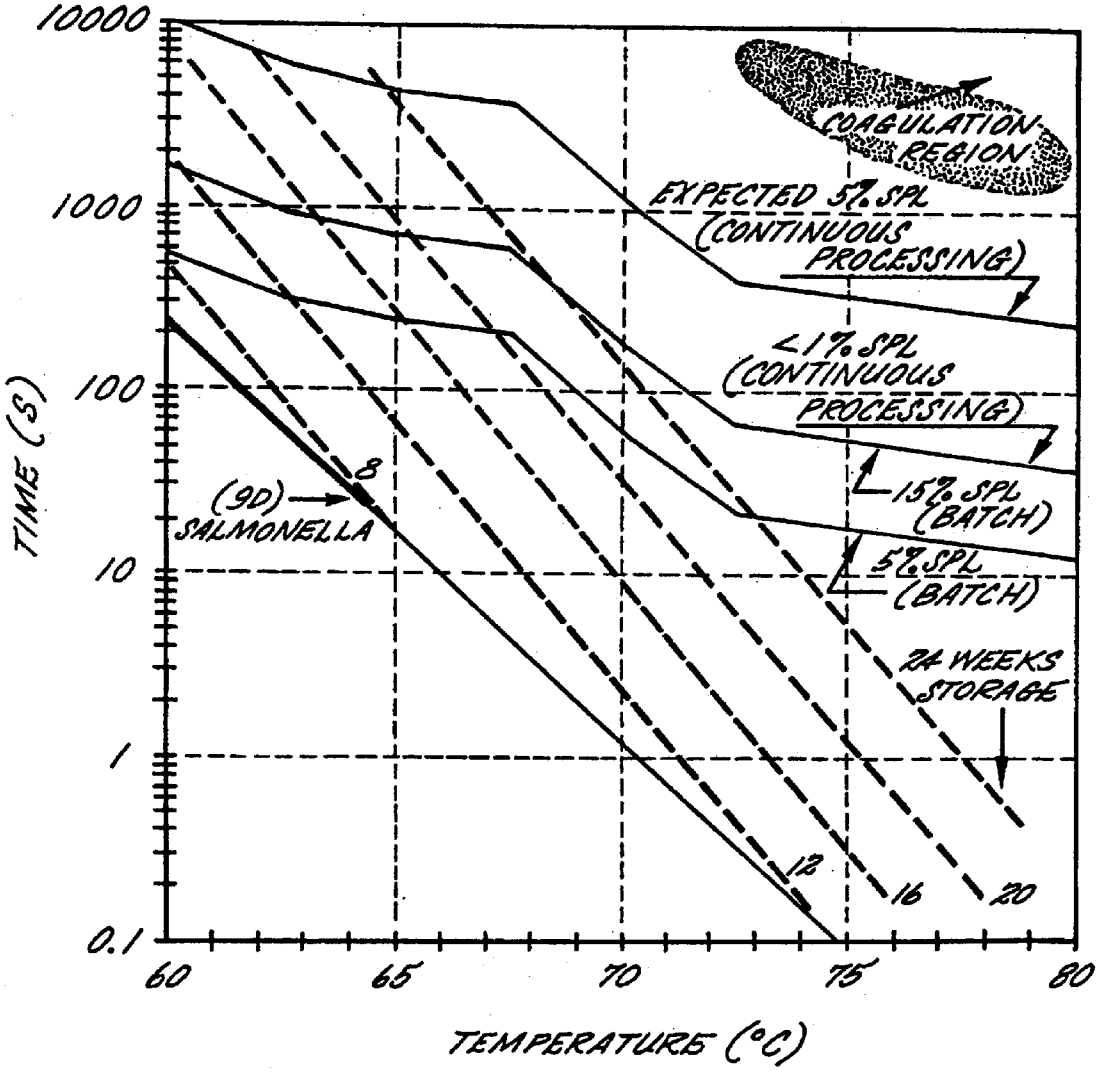

FIG. 5 combines portions of FIGS. 3 and 4. It shows how the thermal treatments selected to provide a desired shelf life can at the same time be selected to provide products with good functional properties. More particularly, thermal treatments can be selected which produce liquid whole egg products having the desired shelf life and a soluble protein loss not greater than 5%.

The foregoing graphs have been presented to aid the understanding of the present invention. Some variation about the plotted lines is to be expected when the present invention is practiced on different equipment, or with different products. These graphs are accordingly not to be taken as limiting the present invention, as departures could be made therefrom while still capturing and benefitting from the teachings of the invention.

To obtain a superior ultrapasteurized liquid whole egg product, the contact time of the liquid product to heated surfaces during pasteurization should be reduced. More particularly, every particle of liquid whole egg product should be in contact with the heated surface or surfaces of the unit in which the product is heated for a total time less than the residence time of the particle in the heating unit. (The term "particle" as used herein has its standard meaning in the egg pasteurization field. See, e.g., 7 C.F.R. § 59.570(b) (1985)). This is accomplished by mixing the product at least periodically while it is being heated. In a continuous flow pasteurizing apparatus, such mixing is accomplished by introducing turbulence into the stream of the product at least periodically while it is being heated, as discussed below Other steps which are preferably employed to reduce fluid element contact time to heated surfaces include providing portions of the thermal treatment in which fluid elements are not in contact with heated surfaces, such as by providing a portion of the thermal treatment in a holding section, and by providing heated contact surface area to product volume ratios of less than 18 $cm^2/cm^3$ (Thus the surface area to volume ratio is preferably less than about 10, and is more preferably in the area of about 2).

It is also desirable to induce physical forces to make the product more homogeneous prior to thermal treatment, such as by inducing shear forces capable of reducing protein and fat unit size. This is preferably accomplished by dispersing the product prior to heating. Dispersing may be carried out with a dispersing valve or with a timing pump, as is known in the art. Such treatment advantageously reduces fouling, and serves to reduce any tendency of the product to coagulate. Such a dispersing step may be carried out by conducting a more rigorous homogenization step, but it is recommended that such more expensive homogenizing equipment be used as described below.

It is preferable that a homogenization step after heating be included. The term "homogenized," as used herein, means to subject the product to physical forces to reduce particle size. Such procedures are known in the art, and may be carried out on different types of equipment. It is preferable to carry out this homogenizing step with homogenizing equipment as total pressures of about 1,000 p.s.i. or more. Pressures of about 1,500 p.s.i. or more are more preferred, and pressures of 2,000 p.s.i. or more still more preferred.

Of these steps, it is particularly desirable to mix the liquid whole egg product at least periodically while it is heated. As noted above, in continuous flow equipment mixing is carried out by at least periodically subjecting the stream of liquid whole egg product to turbulence while it is heated. Turbulence, which is the mixing of particles over the cross-section of the product stream, is discussed in the Egg Pasteurization Manual at pages 6–8. Such turbulence is characterized by a Reynolds number greater than about 2,300, and preferably greater than about 4,600. Commercial high temperature, short time pasteurizing units are available which at least periodically impart turbulence to the stream of product being pasteurized while the product is being heated. For the purposes of the present invention, greater levels of turbulence are preferred. Thus the liquid whole egg product is preferably subjected to turbulence for a major portion of the time it is heated. Plate heat exchangers, trombone heat exchangers, spiral heat exchangers, and scrape surface heat exchangers are illustrative of the types of known heat exchangers which can be used to subject liquid whole egg products to turbulence while they are heated. The physical forces induced in scrape surface heat exchangers are generally thought of as "mixing," but these exchangers induce turbulence at least in regions of the product stream, and are therefore considered to induce turbulence for purposes of the present invention.

Examples of whole egg products which can be pasteurized in liquid form by the method of the present invention include whole egg, fortified whole egg (whole egg with added yolk), salt whole egg (e.g., salt 10%), sugar whole egg (e.g., sugar 10%), blends of whole egg with syrup solids, syrups, dextrose and dextrins and/or gums and thickening agents, blends of whole eggs with less than 1% sugar and/or salt, scrambled egg mixes (for example, a mix of about 51% egg solids, 30% skim milk solids, 15% vegetable oil and 1.5% salt), reduced cholesterol egg products and blends thereof, custard blends, and the like. Products which are extremely sensitive to thermal processing and which are particularly suitable for ultrapasteurization by the present invention include, for example, liquid whole egg and blends thereof (less than 2% added nonegg ingredients), fortified whole egg and blends thereof (24–38% egg solids, 2–12% added nonegg ingredients), liquid salt whole egg, liquid sugar whole egg, and other liquid whole egg blends which are 24–38% egg solids and 12% or less of added nonegg ingredients. Terms used herein have their standard meaning in accordance with industry and regulatory usage. See, e.g., 7 C.F.R. § 59.570(b) (1985).

The invention having been explained in general terms above, the following examples are provided to further illustrate the invention.

EXAMPLES 1–10

Raw Egg Product. Raw liquid whole egg was obtained from a local breaking plant (Gold Kist, Durham, N.C.). The egg was taken from their raw holding tank which was agitated to thoroughly blend approximately 30,000 pounds of egg. The egg was manually filled into 13.6 kg (30 lb) metal cans and were kept refrigerated before being transported 13.2 km (20 mi) to our laboratory in an insulated truck. The egg was held overnight at 4° C. (40° F.) or allowed to stand at room temperature for up to 12 hours to achieve higher bacterial numbers.

Thermal Processes. The time-temperature processes used in this study were designed to be equal to or more severe than minimum conditions defined by the 9D line for the destruction of Salmonella in whole egg (USDA, 1969) and within predetermined limits of denaturation of egg protein defined as percent soluble protein loss (%SPL) by Hamid-Samimi et al., J. Food Sci. 49:132 (1984). The objectives of this design were to provide Salmonella negative whole egg with a low number of surviving spoilage organisms while retaining adequate functional properties.

The thermal processing system used is outlined in FIG. 1. It consisted of a plate-type heat exchanger for preheat, various modifications of the No-Bac Unitherm model XLV (Cherry Burrell Corporation, Cedar Rapids, Iowa) to achieve different holding times, an aseptic homogenizer operated at 10.34 mPa (1,500 p.s.i.), and an aseptic package system (Model AB-3-250, Tetra Pak Inc., Dallas, Tex.). The flow rate was $2.89\times10^{-4}m^3$/sec (275 GPH) with heating, holding, and cooling pipe diameters of 12.45 mm ID (5/8" nominal) stainless steel.

Before each process the entire system was sterilized at 121° C. for 30 minutes using hot water in the product section and steam in the heating media section and then cooled. The product and heating media temperatures were recorded for evaluation of the thermal effect of the heating section and to determine the total thermal effects. (Swartzel, J. Agri. Food Chem. 34:396 (1986). The temperatures were measured using Type T thermocouples with an electronic data logger (Model 9302, Monitor Labs., Inc., San Diego, Calif.). Each thermocouple probe was scanned every 30 seconds (one minute for process #1) and the readout sent to a computer for analyses The specific locations of the thermocouples in the system were as described by Swartzel and Jones. Paper No. 84-6006 of the American Society of Agricultural Engineers (1984).

Approximately one hour prior to initiation of each process, 408.2 kg (900 lb) of raw egg were transferred from the metal cans to a 568 l (150 gal) vessel (Creamery Package Mfg. Co., Chicago, Ill.) and then mixed at room temperature with the stirring propeller at ca. 30 r.p.m. This volume of egg required approximately 20 minutes to process, therefore the last liter of egg was processed not later than 80 minutes after being removed from the cooler. Nine processes designated 1, 2, 3, 4, 5, 6, 7, 8, and 9 were run. Process 6 was repeated and designated 6.1. They were conducted two days apart on egg picked up on the same day. Egg for processes 6.1 to 9 were held at room temperature for not more than 12 hours to achieve a higher initial microbial load. All egg incubated at room temperature was chilled to 4° C. (40° F.) prior to processing.

After holding the egg at the scheduled process time and temperature and prior to packaging, the temperature was reduced to less than 1020 C. (50° F.) in less than 26 seconds. Occasionally, due to technical difficulties it was not possible to cool the processed egg to below 10° C. In those instances the processed egg was moved into a freezer at −20° C. for 20 minutes after packaging. The packaging material was a low oxygen permeable laminate of polyethylene, paper, and aluminum foil formed into 250 ml containers. (Tetra Pak aseptic filler model AB-3). Each package was dated and coded so that egg processed in the first seven minutes, the second seven minutes, and the remaining time were numbered 1, 2, and 3, respectively. The processed and packaged egg was held overnight at 4° C. (40° F.) prior to obtaining samples and being distributed for four and 10° C. storage.

Sampling Samples of raw egg for physical, chemical, and functional testing was aseptically removed from the mixing vat approximately 30 minutes prior to processing. The samples were then held overnight at 4° C. for evaluation with the pasteurized egg. Pasteurized samples were obtained on the day after processing or at selected times during storage at four and 10° C. Analyses were made on the combined contents of three or four individual packages representing the first, second, and third portions of each process run. When four packages were required, two packages from the middle portion of each process were used. Any sediment on the bottom of the cartons was scraped out and mixed into the egg by magnetic stirring.

Chemical Assays. The pH of the product was determined with a Fisher Accumet pH meter, model 600, equipped with a calomel reference and glass indicating electrodes. Solids were determined in triplicate by weighing two ml samples into disposable aluminum pans and drying in a forced draft oven for 24 hours. The AOAC (1985) microKjeldahl procedure was used to determine protein content of the samples. The extent of denaturation was estimated by determining the loss of soluble protein as described by Hammid-Samimi et al., supra, and the alpha-amylase activity of the egg was determined as described by Shrimpton and Monsey, J. Hyg. 60:153 (1962).

Sponge Cakes. True sponge cakes were made by using half of the amounts of ingredients listed following the procedures given by Gorman and Ball (1986) (Chapter 15 in Egg Science and Technology, 3rd Ed., W. J. Stadelman and O. J. Cotterill, Eds., AVI Publishing Co., Inc. Westport, Conn.) with the omission of vanilla. Two separate batches of batter were mixed for each treatment and 340 g of batter was weighed into rectangular pans (21.5×11.5×6.5 cm, id.). Cakes were baked at 191° C. for 25 minutes, inverted on a wire rack and allowed to stand at room temperature overnight. Heights were determined from the mean of four measurements along the center line of the long axis of the cake. Cakes were then kept in plastic bags for further rheological evaluations.

Textural properties of the cakes were evaluated using an Instron Universal Testing Machine (Model 1122, Instron Engineering Corporation, Canton, Mass.) A plate was connected to a 2000-g load cell and positioned at the surface of the 5-cm cube of cake. The cross head and chart speeds were 200 mm/min and 100 mm/min, respectively. Three samples from each cake were subjected to deformation-relaxation cycles. The cubed cake samples were kept in a plastic bag before and after each test. The water activity of the cake samples were determined by placing three Durotherm (Lufft, West Germany) water activity meters in the plastic bag. Each meter was calibrated daily with a solution of barium chloride (aW 0.90 at 20° C.).

Custards. Duplicate custards of the flan type were made. Ingredients were 190-ml evaporated milk, 196-g sweetened condensed milk, 125-g whole egg, 50-g water, and one teaspoon vanilla. All ingredients were blended in a Waring blender at low speed for one minute and 360-g were weighed into a rectangular pan (14.3×8.0×5.6 cm, id.) which had been sprayed with "PAM" (Boyle-Midway, Inc., New York, N.Y.). Pans were placed in a tray containing 2.5-cm water and baked at 191° C. for 40 minutes. After overnight storage at 10° C., height of the custard in the pan was determined from the mean of three measurements made and with calipers along the center line of the long axis of the custard. Custards were removed from the pan after the sides were loosened with a spatula and allowed to stand at room temperature for 45 minutes. Height was again determined and percent sag was calculated according to Gardner et al. Poultry Sci. 61:75 (1982). Custards were stored in plastic bags at 10° C. for rheological evaluation.

The flat plate described above for evaluation of cake texture was replaced with a 10.5 mm diameter rod with a semispherical tip and force-deformation curves to failure were obtained for each custard. Cross head speed was 100 mm/min and all other parameters were the same as used in evaluation of the cakes. Five values were averaged to obtain the penetration force (F1) for each custard.

Organoleptic Evaluation. Flavor of processed and stored egg was evaluated by one judge using the USDA palatability score (Laboratory Methods for Egg Products, USDA, Agricultural Marketing Service Poultry Division, Grading Branch, Washington, D.C. 20250 (1984)).

Thermal Process. The process times and temperatures used in this study are presented in Table 2.

TABLE 2

Actual, Equivalent Times and Temperatures, Calculated Heating Value of Treatments and Predicted % SPL Based on Heating Value[a]

| | Actual | | Equivalent | | Heating | |
|---|---|---|---|---|---|---|
| Proc. No. | Time (Sec.) | Temp. (° C.) | Time (Sec.) | Temp. (° C.) | Value[b] ($G \times 10^{42}$) | Theoretical % SPL[c] |
| 1 | 26.2 | 63.7 | 30.4 | 63.1 | 6.1 | 0.52 |
| 2 | 92.0 | 63.8 | 97.5 | 63.3 | 20.8 | 1.74 |
| 3 | 192.2 | 65.3 | 192.4 | 65.1 | 72.8 | 5.97 |
| 4 | 9.2 | 67.8 | 15.7 | 66.5 | 8.4 | 0.71 |
| 5 | 56.9 | 68.2 | 63.0 | 67.5 | 44.6 | 3.70 |
| 6 | 123.0 | 68.3 | 125.5 | 67.9 | 99.4 | 8.10 |
| 6.1 | 123.0 | 68.9 | 129.0 | 68.4 | 117.6 | 9.50 |
| 7 | 2.7 | 71.5 | 9.5 | 68.5 | 8.9 | 0.75 |
| 8 | 30.1 | 72.2 | 36.5 | 71.5 | 78.9 | 6.46 |
| 9 | 56.7 | 72.0 | 62.5 | 71.8 | 146.8 | 11.70 |

[a]See Swartzel, J. Food Sci. 47:1886 (1982), and Hamid-Samimi et al., supra (1984) for descriptions of heating value and % SPL.
[b]G values are determined based on activation energy for SPL.
[c]Based on laboratory batch data.

The 10 processes, numbers 1–9, were performed in the same chronological order as they are numbered. After gaining process experience and as the result of evaluations during the study, it was determined that longer holding times and temperatures than expected could be used. The actual temperatures reported in Table 3 are the averages of temperature readings, every 30 seconds, of the temperature probes at the beginning and end of the holding tube.

Equivalent times and temperatures as well as holding times and temperatures are set forth in Table 2. It can be seen that equivalent times are generally longer than the corresponding holding times, and equivalent temperatures are generally lower than the corresponding holding temperatures. At longer times, the differences between corresponding holding temperatures and equivalent temperatures are smaller.

The calculated heating value, G, shown in Table 2, gives a means for making a comparison of the relatively severity of the different processes. Processes 9, 6.1, 6 and 8 had the highest G values, respectively. The percent SPL based on the heating value (G) are also shown in Table 2.

Chemical Properties of Processed Egg. The results of alpha-amylase activity assays (Table 3) confirms that the enzyme is inactivated by mild heat processes. Table 3 shows that the thermal processes used did not affect protein content or the soluble protein content.

TABLE 3

Thermal Effects on Alpha-Amylase Activity, Protein Content and % Soluble Protein

| Process | Alpha-Amylase[a] | | | MicroKjeldahl[b] | | | % Soluble Protein[c] (From Ab- |
|---|---|---|---|---|---|---|---|
| No. | Raw | UHT | Plant | Raw | UHT | Plant | sorbance) |
| 1 | 0.045 | 0.048 | 0.099 | 13.10 | 11.60 | 13.1 | 86.2 |
| 2 | 0.033 | 0.588 | — | 12.59 | 11.96 | — | 102.3 |
| 3 | 0.055 | 1.050 | — | 11.67 | 11.32 | — | 101.3 |
| 4 | 0.029 | 0.031 | 0.137 | 11.83 | 11.79 | 11.51 | 101.1 |
| 5 | 0.046 | 1.000 | — | 10.19 | 10.13 | — | 100.3 |
| 6 | 0.053 | 1.120 | — | 12.27 | 12.34 | — | 100.9 |
| 6.1 | 0.040 | 1.130 | — | 12.70 | 12.54 | — | 103.3 |
| 7 | 0.052 | 0.764 | — | 12.37 | 12.53 | — | 104.5 |
| 8 | 0.063 | 1.000 | — | 11.19 | 11.42 | — | 100.4 |
| 9 | 0.060 | 1.170 | — | 11.74 | 11.77 | — | 100.7 |

[a]Alpha-Amylase data is reported as the absorbance at 585 nm. Activity is inversely related in absorbance.
[b]MicroKjeldahl data is reported as percent protein.
[c]Absorbance at 280 nm of heated egg/control (raw) egg in solution as described by Hamid-Samimi et al., supra (1984).

The chemical data indicate that the processes did not result in extensive damage to the egg proteins. The predicted percent soluble protein losses (Table 3) were based on studies conducted with small amounts of egg (1 ml) being heated in the cup of a brookfield viscometer (Hamid-Samimi et al., supra, 1984). The egg was heated while various shear rates were applied to simulate egg under dynamic conditions that exist in conventional heat exchangers. Thus, this work revealed that the model system resulted in prediction equations that underestimated the thermal treatments that liquid whole egg products could tolerate while still obtaining products with good functional properties. Analysis of the causes of these unexpectedly good results led to the guidelines discussed above which should be followed to obtain functionally superior ultrapasteurized products.

Function of Processed Eggs. The functional properties of the processed eggs agreed with the physical and chemical results. Based on the data presented in Tables 4 and 5 for nonstored egg, there appeared to be very little heat effect on the performance of the ultrapasteurized egg relative to raw or commercially pasteurized egg. Cake height as an indication of the leavening ability and force to deform, springiness, and relaxation parameter (Peleg and Normand, Rheologica Acta 22:108 (1983)) as indicators of textural properties were very similar for all egg examined.

TABLE 4

Functional Properties of Cakes for Control (Raw), Ultrapasteurized (UP) at Zero Day Storage, and Commercially Pasteurized Eggs (Plant)

| Variable | Treat-ment | Mean | Minimum | Maximum | n | C.V. |
|---|---|---|---|---|---|---|
| Maximum | Raw | 10.02 | 7.79 | 13.70 | 10 | 17.3 |
| Force[a] | UP | 10.49 | 9.18 | 12.91 | 10 | 10.5 |
| (N) | Plant | 9.73 | 9.56 | 9.91 | 2 | 2.5 |

TABLE 4-continued

Functional Properties of Cakes for Control (Raw), Ultrapasteurized (UP) at Zero Day Storage, and Commercially Pasteurized Eggs (Plant)

| Variable | Treatment | Mean | Minimum | Maximum | n | C.V. |
|---|---|---|---|---|---|---|
| Relaxation[b] | Raw | 0.394 | 0.379 | 0.417 | 10 | 3.24 |
| | UP | 0.410 | 0.395 | 0.442 | 10 | 3.34 |
| Parameter | Plant | 0.402 | 0.402 | 0.403 | 2 | 0.17 |
| Springiness[c] | Raw | 0.83 | 0.81 | 0.86 | 10 | 1.94 |
| | UP | 0.83 | 0.81 | 0.87 | 10 | 2.47 |
| | Plant | 0.82 | 0.81 | 0.82 | 2 | 1.32 |
| Cake Height (mm) | Raw | 65.1 | 63.3 | 66.7 | 10 | 1.66 |
| | UP | 61.7 | 55.1 | 65.5 | 10 | 5.26 |
| | Plant | 64.8 | 64.7 | 64.8 | 2 | 0.11 |
| Water Activity | Raw | 0.873 | 0.832 | 0.891 | 10 | 2.53 |
| | UP | 0.875 | 0.835 | 0.892 | 10 | 2.37 |
| | Plant | 0.892 | 0.892 | 0.892 | 1 | — |

[a]Force required to deform the sample of cake by 26 mm.
[b]Asymptotic relaxation value as defined by Peleg and Normand, supra (1983).
[c]Ratio of the second peak force to the first peak force in the force deformation cycle.

TABLE 5

Functional Properties of Custards for Controls (Raw), Zero Day Storage Ultrapasteurized (UP) and Commercially Pasteurized Eggs (Plant)

| Variable | Treatment | Mean | Minimum | Maximum | n | C.V. |
|---|---|---|---|---|---|---|
| Penetration Force (N) | Raw | 0.82 | 0.76 | 0.96 | 10 | 8.20 |
| | UP | 0.70 | 0.59 | 0.80 | 10 | 8.56 |
| | Plant | 0.79 | 0.77 | 0.81 | 2 | 3.69 |
| Custard Height (mm) | Raw | 35.7 | 35.1 | 36.7 | 10 | 1.66 |
| | UP | 35.6 | 35.1 | 36.3 | 10 | 5.26 |
| | Plant | 34.6 | 34.0 | 35.3 | 2 | 0.11 |
| % Sag | Raw | 7.2 | 5.65 | 9.54 | 10 | 16 |
| | UP | 7.1 | 5.41 | 8.56 | 10 | 13 |
| | Plant | 4.6 | 2.66 | 6.51 | 2 | 59 |

The water activity of the cakes were similar indicating that the experimental handling procedures for the cakes were uniform and should not have affected the instrumental evaluation of textural properties. The custard data indicated that all egg sources evaluated had good ability to form gels. The gels had excellent integrity as indicated by the relatively low percent sag, yet the custards were relatively tender as indicated by the penetration forces. Although weep was not measured, very little syneresis was noted even after holding the custards overnight for textural evaluation. The limited organoleptic evaluation of the processed eggs indicated that the thermal processes did not affect flavor or aroma in scrambled eggs relative to scrambled egg made from a fresh shell egg. The USDA palatability scores were seven to eight (eight being the highest score).

Refrigerated Storage Effect. As long as the processed egg was not obviously spoiled, as indicated by organoleptic evaluations, storage 4° C. maintained the chemical, functional, and organoleptic properties of the processed egg up to 24 weeks for some of the samples. The data presented in Tables 6, 7, and 8 were taken from stored egg that was judged organoleptically sound. The criteria for that judgment were: (1) that the color was normal, i.e., within the expected range of color observed for eggs immediately post-processing, and (2) that there were no objectional aromas or flavors. In this study, because of the sampling procedure where most of the samples were checked at four-week intervals, there were no borderline decisions, a sample was obviously acceptable or unacceptable. Bright yellow colors, off-aromas, and pH values below seven were typical of samples judged to be spoiled.

TABLE 6

Means for Proteins, Solids and pH for Controls (Raw), Commercially Pasteurized (Plant) and Ultrapasteurized (UP) Egg

| Variable | Treatment | Mean | Minimum | Maximum | n | C.V. |
|---|---|---|---|---|---|---|
| % Protein | Raw | 11.92 | 10.19 | 13.10 | 10 | 6.8 |
| | Plant | 12.30 | 11.51 | 13.10 | 2 | 9.1 |
| | UP 0 | 11.74 | 10.13 | 12.54 | 10 | 6.0 |
| % Solids | Raw | 24.6 | 23.9 | 25.2 | 10 | 1.6 |
| | Plant | 24.8 | 24.4 | 25.2 | 2 | 2.5 |
| | 0 | 24.5 | 24.0 | 25.0 | 10 | 1.3 |
| | 4 | 24.4 | 24.0 | 24.9 | 10 | 1.3 |
| | UP 8 | 24.4 | 24.0 | 24.7 | 9 | 0.9 |
| | 12 | 24.3 | 23.8 | 24.7 | 7 | 1.3 |
| | 18 | 24.9 | 24.4 | 25.5 | 2 | 3.1 |
| | 24 | 24.8 | 24.7 | 24.9 | 2 | 0.3 |
| pH | Raw | 7.5 | 7.2 | 7.6 | 10 | 1.7 |
| | Plant | 7.1 | 7.1 | 7.2 | 2 | 0.5 |
| | 0 | 7.5 | 7.3 | 7.6 | 10 | 1.4 |
| | 4 | 7.4 | 7.2 | 7.6 | 10 | 1.4 |
| | UP 8 | 7.4 | 7.3 | 7.5 | 9 | 1.2 |
| | 12 | 7.3 | 7.2 | 7.4 | 7 | 1.2 |
| | 18 | 7.4 | 7.4 | 7.4 | 2 | 0 |
| | 24 | 7.4 | 7.4 | 7.4 | 2 | 0 |

[a]Numbers indicate storage at 4° C. in weeks for processed eggs.

TABLE 7

Functional Properties of Cakes Made from Eggs Stored at 4° C.

| Variable | Storage (Weeks) | Mean | Minimum | Maximum | n | C.V. |
|---|---|---|---|---|---|---|
| Maximum Force[a] (N) | 4 | 9.78 | 7.90 | 14.95 | 10 | 21.3 |
| | 8 | 10.37 | 7.82 | 14.53 | 9 | 20.5 |
| | 12 | 11.39 | 8.84 | 14.28 | 7 | 18.2 |
| | 18 | 11.42 | 10.32 | 12.53 | 2 | 13.6 |
| | 24 | 10.53 | 9.57 | 11.49 | 2 | 12.9 |
| Relaxation Parameter[b] | 4 | .3937 | 0.3759 | 0.4167 | 10 | 3.7 |
| | 8 | .3876 | 0.3636 | 0.4132 | 9 | 3.9 |
| | 12 | .3846 | 0.3717 | 0.4032 | 7 | 3.0 |
| | 18 | .3788 | 0.3788 | 0.3788 | 2 | 3.1 |
| | 24 | .3745 | 0.3704 | 0.3788 | 2 | 1.5 |
| Springiness[c] | | 0.829 | 0.799 | 0.853 | 10 | 1.7 |
| | 8 | 0.834 | 0.811 | 0.872 | 9 | 2.0 |
| | 12 | 0.834 | 0.820 | 0.843 | 7 | 0.9 |
| | 18 | 0.831 | 0.829 | 0.832 | 2 | 0.3 |
| | 24 | 0.815 | 0.787 | 0.843 | 2 | 4.9 |
| Height (mm) | 4 | 61 | 54 | 65 | 10 | 6.02 |
| | 8 | 64 | 63 | 67 | 9 | 2.06 |
| | 12 | 64 | 60 | 65 | 7 | 2.7 |
| | 18 | 63 | 62 | 65 | 2 | 3.0 |
| | 24 | 65 | 65 | 65 | 2 | 0.22 |
| Water Activity | 4 | 0.860 | 0.796 | 0.888 | 10 | 4.2 |
| | 8 | 0.884 | 0.868 | 0.900 | 9 | 1.1 |
| | 12 | 0.879 | 0.844 | 0.896 | 7 | 2.0 |
| | 18 | 0.872 | 0.872 | 0.872 | 1 | — |
| | 24 | 0.879 | 0.876 | 0.882 | 2 | 0.4 |

[a,b,c]See Table 4 for definition of terms.

TABLE 8

Functional Properties of Custards Made from Eggs Stored at 4° C.

| Variable | Storage (Weeks) | Mean | Minimum | Maximum | n | C.V. |
|---|---|---|---|---|---|---|
| Pene- | 4 | 0.68 | 0.47 | 0.77 | 10 | 12.7 |
| tration | 8 | 0.70 | 0.64 | 0.76 | 9 | 9.1 |
| Force | 12 | 0.75 | 0.57 | 0.83 | 7 | 20.3 |
| (N) | 18 | 0.94 | 0.85 | 1.02 | 2 | 12.6 |
| | 24 | 0.82 | 0.76 | 0.88 | 2 | 10.5 |
| Custard | 4 | 35 | 34 | 36 | 10 | 2.4 |
| Height | 8 | 35 | 34 | 36 | 9 | 1.6 |
| (mm) | 12 | 35 | 35 | 36 | 7 | 1.2 |
| | 18 | 36 | 36 | 36 | 2 | 0.4 |
| | 24 | 35 | 35 | 35 | 2 | 1.0 |
| % Sag | 4 | 7.1 | 3.0 | 11.6 | 10 | 38.1 |
| | 8 | 5.9 | 3.5 | 7.5 | 9 | 20.5 |
| | 12 | 6.5 | 4.6 | 8.0 | 7 | 19.5 |
| | 18 | 7.2 | 6.4 | 8.1 | 2 | 15.9 |
| | 24 | 6.6 | 4.9 | 8.2 | 2 | 36.0 |

Visual observations of the interiors of opened packages revealed very little sedimentation during storage. A very thin layer of a fine, light yellow, granular-like material was observed on the bottom of cartons after four weeks of refrigerated storage.

Shelf Life. The times of spoilage of egg from each trial are presented in Table 9.

TABLE 9

Shelf Life for Liquid Whole Egg Stored at 4° C.

| Process | Shelf Life (Weeks) |
|---|---|
| 1 | 4–8 |
| 2 | 8–12 |
| 3 | >12 |
| 4 | 8–12 |
| 5 | >18 |
| 6 | 18–24 |
| 6.1 | >24 |
| 7 | 12–18 |
| 8 | 20–24 |
| 9 | 18–20 |

These data were used to generate the time and temperature guidelines set forth in FIG. 5.

The invention has been discussed with a degree of specificity above. This discussion has been provided for illustrative purposes only, with the scope of the invention being defined by the following claims.

That what which is claimed is:

1. A method of ultrapasteurizing a liquid whole egg product, comprising passing the liquid whole egg product as a continuous stream through a pasteurizing apparatus, during which the liquid whole egg product is (a) heated to a predetermined holding temperature by contacting said liquid whole egg product to a heated surface, then (b) maintained at said predetermined holding temperature for a predetermined holding time, and then (c) cooled, wherein the total thermal treatment received by the liquid whole egg product is defined by an equivalent temperature and an equivalent time defining a point above the 5% SPL (Batch) line of FIG. 3, but insufficient to cause coagulation of the liquid whole egg product, and then (d) aseptically packaged to provide a packaged liquid whole egg product characterized by a refrigerated shelf life of about four weeks to about 36 weeks.

2. A method according to claim 1, wherein said pasteurizing apparatus is sterilized before said liquid whole egg product is passed therethrough, and wherein said packaged liquid whole egg product is characterized by a preselected shelf life of about eight weeks to about 36 weeks.

3. A method according to claim 1, wherein said liquid whole egg product is subjected to turbulence for a major portion of the time said liquid whole egg product is heated.

4. A method of ultrapasteurizing a liquid whole egg product, comprising passing the liquid whole egg product as a continuous stream through a pasteurizing apparatus, during which the liquid whole egg product is heated to a predetermined real temperature by contacting said liquid whole egg product to a heated surface while at least periodically subjecting said continuous stream of liquid whole egg product to turbulence, wherein the total thermal treatment received by the liquid whole egg product is described by an equivalent time and an equivalent temperature defining a point above the 5% SPL (Batch) line of FIG. 3, but insufficient to cause said liquid whole egg product to coagulate, followed by aseptically packaging the liquid whole egg product to provide a [package] *packaged* liquid whole egg product characterized by a refrigerated shelf life of about four weeks to about 36 weeks.

5. A method according to claim 4, wherein said liquid whole egg product is subjected to turbulence for a major portion of the time said liquid whole egg product is heated.

6. A method according to claim 4, wherein said liquid whole egg product is dispersed before said liquid whole egg product is heated.

7. The method according to claim 4, wherein said pasteurizing apparatus is sterilized before said liquid whole egg product is passed therethrough, and wherein said packaged liquid whole egg product is characterized by a preselected shelf life of about eight weeks to about 36 weeks.

8. A method of ultrapasteurizing a liquid whole egg product, comprising passing the liquid whole egg product as a continuous stream through a pasteurizing apparatus, during which the liquid whole egg product is (a) heated to a predetermined holding temperature by [contracting] *contacting* said liquid whole egg product to a heated surface while at least periodically subjecting said continuous stream of liquid whole egg product to turbulence, then (b) maintained at said predetermined holding temperature for a predetermined holding time, and then (c) cooled, wherein the total thermal treatment received by the liquid whole egg product is defined by an equivalent time and an equivalent temperature above the 5% SPL (batch) line of FIG. 3, but insufficient to cause said liquid whole egg product to coagulate, and then (d) aseptically packaged to provide a packaged liquid whole egg product characterized by a refrigerated shelf life of about four weeks to about 36 weeks.

9. A method according to claim 8, wherein said liquid whole egg product is subjected to turbulence for a major portion of the time said liquid whole egg product is heated.

10. A method according to claim 8, wherein said liquid whole egg product is dispersed before said liquid whole egg product is heated.

11. A method according to claim 8, wherein said pasteurizing apparatus is sterilized before said liquid whole egg product is passed therethrough, and wherein said packaged liquid whole egg product is characterized by a preselected shelf life of about eight weeks to about 36 weeks.

12. A method of making a packaged liquid whole egg product characterized by a preselected refrigerated shelf life of about four weeks to about 36 weeks, comprising passing the liquid whole egg product as a continuous stream through a pasteurizing apparatus, during which the liquid whole egg product is heated by contacting said liquid whole egg product to a heated surface for a predetermined time and to a predetermined temperature while at least periodically subjecting said continuous stream of liquid whole egg product to turbulence, wherein the liquid whole egg product is heated for a predetermined time and to a predetermined temperature selected so that the total thermal treatment received by the liquid whole egg product is defined by an equivalent time and an equivalent temperature not greater than the [expected] 5% SPL (continuous processing) line of FIG. 3 *and above the 5% SPL (BATCH) line of FIG. 3*, and wherein said predetermined temperature and said predetermined time are chosen to impart said preselected shelf life to said liquid whole egg product, followed by [aspetically] packaging the liquid whole egg product.

13. A method according to claim 12 wherein said pasteurizing apparatus is sterilized before said liquid whole egg product is passed therethrough, and wherein said packaged liquid whole egg product is characterized by a preselected shelf life of about eight weeks to about 36 weeks.

14. A method according to claim 12 wherein said liquid whole egg product is subjected to turbulence for major portion of the time said liquid whole egg product is heated.

15. A method of making a packaged liquid whole egg product characterized by a preselected refrigerated shelf life of about four weeks to about 36 weeks, comprising passing the liquid whole egg product as a continuous stream through a pasteurizing apparatus, during which the liquid whole egg product is (a) heated by contacting said liquid whole egg product to a heated surface for a time sufficient to raise said liquid whole egg product to a predetermined holding temperature while at least periodically subjecting said continuous stream of liquid whole egg product to turbulence, then (b) maintained at said predetermined holding temperature for a predetermined hold time, wherein said holding temperature and holding time are selected so that the total thermal treatment received by the liquid whole egg product is defined by an equivalent time and an equivalent temperature not greater than the [expected] 5% SPL (continuous processing) line of FIG. 3 *and above the 5% SPL (BATCH) line of FIG. 3*, and wherein said holding temperature and holding time are selected to impart said preselected shelf life to said liquid whole egg product, and then (c) cooled, followed by (d) [aseptically] packaging the liquid whole egg product.

16. A method according to claim 15, wherein said pasteurizing apparatus is sterilized before said liquid whole egg product is passed therethrough, and wherein said packaged liquid whole egg product is characterized by preselected shelf life of about eight weeks to about 36 weeks.

17. A method according to claim 16 wherein said liquid whole egg product is subjected to turbulence for a major portion of the time said liquid whole egg product is heated.

18. A method according to claim 1, 4, 8, 12, *or* 16, wherein said liquid whole egg product is liquid whole egg.

19. A method according to claim 1, 4, 8, 12, *or* 16, wherein said liquid whole egg product is a liquid whole egg blend which is about 24–38% egg solids and about 12% or less of added nonegg ingredients.

*20. A packaged liquid whole egg product having a shelf life of from about 16 to 36 weeks under refrigerated conditions, wherein the liquid whole egg product comprises liquid whole egg product out of the shell and wherein said liquid whole egg product is liquid whole egg.*

*21. An aseptically packaged liquid whole egg product having a shelf life of from about 16 to 36 weeks under refrigerated conditions and consisting essentially of liquid whole egg product.*

*22. A liquid whole egg product according to claim 21 wherein said liquid whole egg product is a reduced cholesterol liquid whole egg product.*

*23. A liquid whole egg product according to claim 21 wherein said liquid whole egg product is essentially free of Salmonella.*

*24. A liquid whole egg product according to claim 21, wherein said liquid whole egg product contains not more than 12% of added non-egg ingredients.*

*25. A liquid whole egg product according to claim 21, wherein said liquid whole egg product comprises at least 5% liquid whole egg.*

*26. The product of claim 21 wherein said liquid whole egg product is liquid whole egg.*

* * * * *